(12) United States Patent
Tate et al.

(10) Patent No.: US 12,261,962 B2
(45) Date of Patent: Mar. 25, 2025

(54) INFORMATION COMMUNICATION METHOD, INFORMATION COMMUNICATION SYSTEM AND METHOD

(71) Applicant: connectFree Corporation, Kyoto (JP)

(72) Inventors: Kristopher Andrew Tate, Kyoto (JP); Mitsuhiro Okamoto, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 0 days.

(21) Appl. No.: 17/413,322

(22) PCT Filed: Dec. 5, 2019

(86) PCT No.: PCT/JP2019/047642
§ 371 (c)(1),
(2) Date: Jun. 11, 2021

(87) PCT Pub. No.: WO2020/121942
PCT Pub. Date: Jun. 18, 2020

(65) Prior Publication Data
US 2021/0385209 A1    Dec. 9, 2021

(30) Foreign Application Priority Data
Dec. 12, 2018    (JP) .................. 2018-232482

(51) Int. Cl.
*H04L 9/32*    (2006.01)
*H04L 9/08*    (2006.01)
(Continued)

(52) U.S. Cl.
CPC .......... *H04L 9/3247* (2013.01); *H04L 9/0866* (2013.01); *H04L 61/50* (2022.05);
(Continued)

(58) Field of Classification Search
CPC . H04L 9/3247; H04L 63/0823; H04L 63/102; H04L 63/0861; H04L 51/42;
(Continued)

(56) References Cited

U.S. PATENT DOCUMENTS 9,172,699 B1 * 10/2015 Vazquez ............. H04L 63/0861
9,641,328 B1 * 5/2017 Bennett ................ H04L 9/0866
(Continued)

FOREIGN PATENT DOCUMENTS

CN    102006299 B    7/2013
JP    2002-207929 A    7/2002
(Continued)

OTHER PUBLICATIONS

International Search Report for PCT/JP2019/047642, mailed Feb. 18, 2020.
(Continued)

*Primary Examiner* — Kyung H Shin
(74) *Attorney, Agent, or Firm* — Merchant & Gould P.C.

(57) ABSTRACT

An information communication method and an information communication system are capable of securely using user information. An information communication method includes a step of uniquely setting a first network address authenticated by a certificate authority in a terminal device in advance. The method also includes uniquely setting a second network address authenticated by the certificate authority in a server in advance and associating the first network address with user information. The method further includes making a communication connection between the terminal device and the server, in which the server refers to the user information.

23 Claims, 10 Drawing Sheets

(51) Int. Cl.
*H04L 9/40* (2022.01)
*H04L 61/50* (2022.01)
*H04W 8/18* (2009.01)
*H04W 8/26* (2009.01)

(52) U.S. Cl.
CPC ...... *H04L 63/0823* (2013.01); *H04L 63/0861* (2013.01); *H04L 63/10* (2013.01); *H04W 8/18* (2013.01); *H04W 8/26* (2013.01)

(58) Field of Classification Search
CPC ............ H04L 63/0272; H04L 63/0853; H04L 63/0807; H04L 9/0866; H04L 9/3033; H04L 9/0863; H04L 9/30; H04L 9/0869; H04L 63/10; H04L 63/101; H04L 63/083; H04L 63/08; G06F 21/32; G06F 21/45; H04W 12/068; H04W 12/069
See application file for complete search history.

(56) References Cited

U.S. PATENT DOCUMENTS

| | | | |
|---|---|---|---|
| 2006/0048212 A1 | 3/2006 | Tsuruoka et al. | |
| 2007/0061574 A1* | 3/2007 | Shelest | H04L 9/3247 713/170 |
| 2009/0089357 A1 | 4/2009 | Murray et al. | |
| 2013/0333002 A1* | 12/2013 | Belton | H04L 63/10 726/5 |
| 2017/0171200 A1 | 6/2017 | Bao et al. | |
| 2018/0262484 A1* | 9/2018 | Kesari | H04L 51/42 |
| 2019/0384773 A1 | 12/2019 | Harada | |

FOREIGN PATENT DOCUMENTS

| | | |
|---|---|---|
| JP | 2004-62417 A | 2/2004 |
| JP | 2005-513660 A | 5/2005 |
| JP | 2005-244573 A | 9/2005 |
| JP | 2005-339093 A | 12/2005 |
| JP | 2008-539519 A | 11/2008 |
| JP | 2011-166375 A | 8/2011 |
| JP | 2012-516654 A | 7/2012 |
| JP | 2014-521146 A | 8/2014 |
| JP | 2014-535216 A | 12/2014 |
| JP | 2018-61227 A | 4/2018 |
| JP | 2018-104085 A | 7/2018 |
| JP | 2018-142247 A | 9/2018 |
| WO | 03/055170 A1 | 7/2003 |
| WO | 2005/011192 A1 | 2/2005 |
| WO | 2006/118829 A2 | 11/2006 |
| WO | 2010/088316 A1 | 8/2010 |
| WO | 2013/003419 A1 | 1/2013 |
| WO | 2013/063494 A1 | 5/2013 |

OTHER PUBLICATIONS

Search Report for European Patent Application No. 19895541.1 (Jul. 15, 2022).
Japanese Office Action received for JP Application No. 2018-232482 on Apr. 22, 2024, 24 pgs.
Office Action for Japanese Patent Application No. 2018-232482 (Nov. 15, 2022).
Office Action for Japanese Patent Application No. 2018-232482 (Apr. 4, 2023).

* cited by examiner

INFORMATION COMMUNICATION METHOD, INFORMATION COMMUNICATION SYSTEM AND METHOD

This application is a National Stage of PCT/JP2019/047642, filed Dec. 5, 2019, which claims benefit of Japanese Patent Application No. 2018-232482, filed Dec. 12, 2018 which applications are incorporated herein by reference. To the extent appropriate, a claim of priority is made to each of the above-disclosed applications.

TECHNICAL FIELD

The present disclosure relates to an information communication method, an information communication system, and a method.

BACKGROUND ART

The development of information and communication technology has been remarkable in recent years, and devices connected to networks such as the Internet are not limited to information processing devices used by users, such as conventional personal computers or smartphones, but are spreading to various things, for example, servers or industrial measurement devices. Such a technology trend is called "Internet of Things (IoT)", and various technologies and services have been proposed and put into practical use (see Patent Document 1).

For example, in Patent Document 1, an IP address is assigned to a measurement device by a provider, so that it is necessary to perform protocol conversion by an IoT relay device in order to perform communication from each measurement device to a cloud server. In addition, in the conventional method, when performing communication between a local area network (LAN) and another local area network (LAN), it is general for the communication that a global IP address is fixed to determine a communication partner and IP packets are encrypted to maintain security.

In addition, on a network, data communication between devices is usually realized by using a network address statically or dynamically assigned to each device. As such a network address, an internet protocol (IP) address is typically used.

In general, IP addresses include those that are uniquely determined on the Internet, such as global addresses, and those that are assigned without duplication on private networks, such as private addresses. In addition, there is also a mechanism for dynamically assigning an IP address using dynamic host configuration protocol (DHCP) or the like.

Thus, for the IP address setting, only assignment without duplication on the same network is considered for data communication. That is, the IP address is a network address that is arbitrarily set according to the target network.

CITATION LIST

Patent Literature

PTL 1: Patent Document 1: JP 2018-142247 A

SUMMARY OF INVENTION

Technical Problem

The conventional network address is assigned by the provider as identification information for identifying the communication destination. However, the address itself does not have any reliability. For this reason, the authentication process when performing data communication between devices using the IP address is realized in a higher layer (for example, application layer).

For example, an SNS service operating company, an Internet shopping provider, or a membership site operating company (hereinafter, may be referred to as a service provider) needs to acquire and use user information when providing a service. The user information is a name, a date of birth, a gender, an address, a telephone number, various kinds of account information, and the like. The service provider creates a service use account based on the user information and assigns the service use account to the user. The service provider manages the service use account as user information on the internal server or the external server.

However, considering the recent security situation, managing the user information itself can be a risk in service operation for the service provider. In the service provider, in order to prevent the user information from being leaked from the server, it is necessary to take expensive security measures at the application layer, for example. However, with the current Internet system, strengthening security at the application layer may not be enough. In addition, the efforts of the user may not be sufficient.

It is an object of the disclosure to provide an information communication method and an information communication system capable of securely using user information.

Solution to Problem

An information communication method according to an aspect of the disclosure includes: a step of uniquely setting a first network address authenticated by a certificate authority in a terminal device associated with a user in advance; a step of uniquely setting a second network address authenticated by the certificate authority in a server in advance; a step of associating the first network address with user information of the user; a step of making a communication connection between the terminal device and the server; and a step in which the server refers to the user information.

According to the information communication method described above, it is not necessary for the service provider to manage the user information.

The information communication method may further include: a step of generating the first network address in the terminal device; a step of generating the second network address in the server; and a step of setting the first network address and the second network address in the terminal device and the server, respectively, after authenticating the first network address and the second network address by the certificate authority.

According to the information communication method described above, authentication is performed before the network address is set in the device. Since it is possible to determine whether or not communication is possible based on the authentication information, spoofing can be appropriately prevented.

In the information communication method, after referring to the user information, the server may provide a service based on the user information without acquiring the user information of the user who owns the terminal device.

According to the information communication method described above, since it is not necessary for the user to input the user information, the user does not feel stress on the service.

In the information communication method, the association of the user information may be performed by the user's approval.

According to the information communication method described above, the user can grasp that the user information association processing is performed.

In the information communication method, the association of the user information may be performed at a request of the server.

According to the information communication method described above, since the association of the user information is performed as needed, it is possible to save the trouble of the user performing the association operation in advance.

In the information communication method, the terminal device may be a portable terminal, and the portable terminal may associate user information at the time of line contract with the first network address.

According to the information communication method described above, data at the time of line contract of the portable terminal can be used as it is as user information.

An information communication method according to an aspect of the disclosure includes: a step of uniquely setting a first network address authenticated by a certificate authority in a terminal device associated with a user in advance; a step of uniquely setting a second network address authenticated by the certificate authority in a server in advance; a step of associating the first network address with user information of the user; a step of making a communication connection between the terminal device and the server; a step in which the server refers to the user information; and a step in which the server determines whether or not the user has a service use account based on the user information.

According to the information communication method described above, it is possible to efficiently promote the service provided by the service provider.

The information communication method may further include: a step of generating the first network address in the terminal device; a step of generating the second network address in the server; and a step of setting the first network address and the second network address in the terminal device and the server, respectively, after authenticating the first network address and the second network address by the certificate authority.

According to the information communication method described above, authentication is performed before the network address is set in the device. Since it is possible to determine whether or not communication is possible based on the authentication information, spoofing can be appropriately prevented.

In the information communication method, when it is determined in the determination step that the user does not have the service use account, the server may request the terminal device to generate the service use account.

According to the information communication method described above, since the service provider can determine whether or not the user is a guest or has a service use account, the service use proposal can be made only to the guest user.

In the information communication method, when it is approved to generate the service use account on the terminal device, the server may store service use account information.

According to the information communication method described above, it is only necessary to store whether or not there is a service use account, and it is not necessary to store other confidential information.

In the information communication method, when it is determined in the determination step that the user has the service use account, the server may permit the terminal device to use a service.

According to the information communication method described above, no stress is given to the user who is already using the service.

In addition, in the information communication method, the terminal device may be a portable terminal, and the portable terminal may associate user information at the time of line contract with the first network address.

According to the information communication method described above, data at the time of line contract of the portable terminal can be used as it is as user information.

In an information communication method according to an aspect of the disclosure, a first network address authenticated by a certificate authority, a second network address authenticated by the certificate authority, and a third network address authenticated by the certificate authority are present. The information communication method includes: a step of authenticating the first network address by the third network address; a step of associating the second network address with the third network address for authentication; and a step of authenticating the first network address authenticated as the third network address by the second network address.

According to the information communication method described above, since a data issuer authenticates the user, the service provider does not need to access the database of the data issuer to check the authentication.

In the information communication method, the first, second, and third network addresses may be set in a device after being authenticated by the certificate authority.

According to the information communication method described above, authentication is performed before the network address is set in the device. Since it is possible to determine whether or not communication is possible based on the authentication information, spoofing can be appropriately prevented.

In the information communication method, the first network address may be set in a terminal device, the second network address may be set in a first server, and the third network address may be set in a second server.

According to the information communication method described above, the user can use a predetermined service without being aware of the information of the data issuer when using the predetermined service in a predetermined terminal device. In addition, in the service provider or the like, it is possible to save the trouble of checking the authenticity of the data.

An information communication system according to an aspect of the disclosure includes: a terminal device; a server; an authentication server; a first network address that is uniquely set in advance in the terminal device by obtaining authentication from the authentication server; and a second network address that is uniquely set in advance in the server by obtaining authentication from the authentication server. The first network address is associated with user information in the terminal device. The server refers to the user information when communicating with the terminal device.

According to the information communication system described above, it is not necessary for the service provider to manage the user information.

Advantageous Effects of Invention

According to the disclosure, it is possible to provide the information communication method and the information communication system capable of securely using user information.

DESCRIPTION OF EMBODIMENTS

Hereinafter, the present embodiment will be described in detail with reference to the diagrams. In addition, the same or corresponding portions in the diagrams are denoted by the same reference numerals, and the description thereof will not be repeated. In addition, when there are a plurality of embodiments, the common reference numerals are used by reference, and the description thereof will not be repeated.

Figure 1:
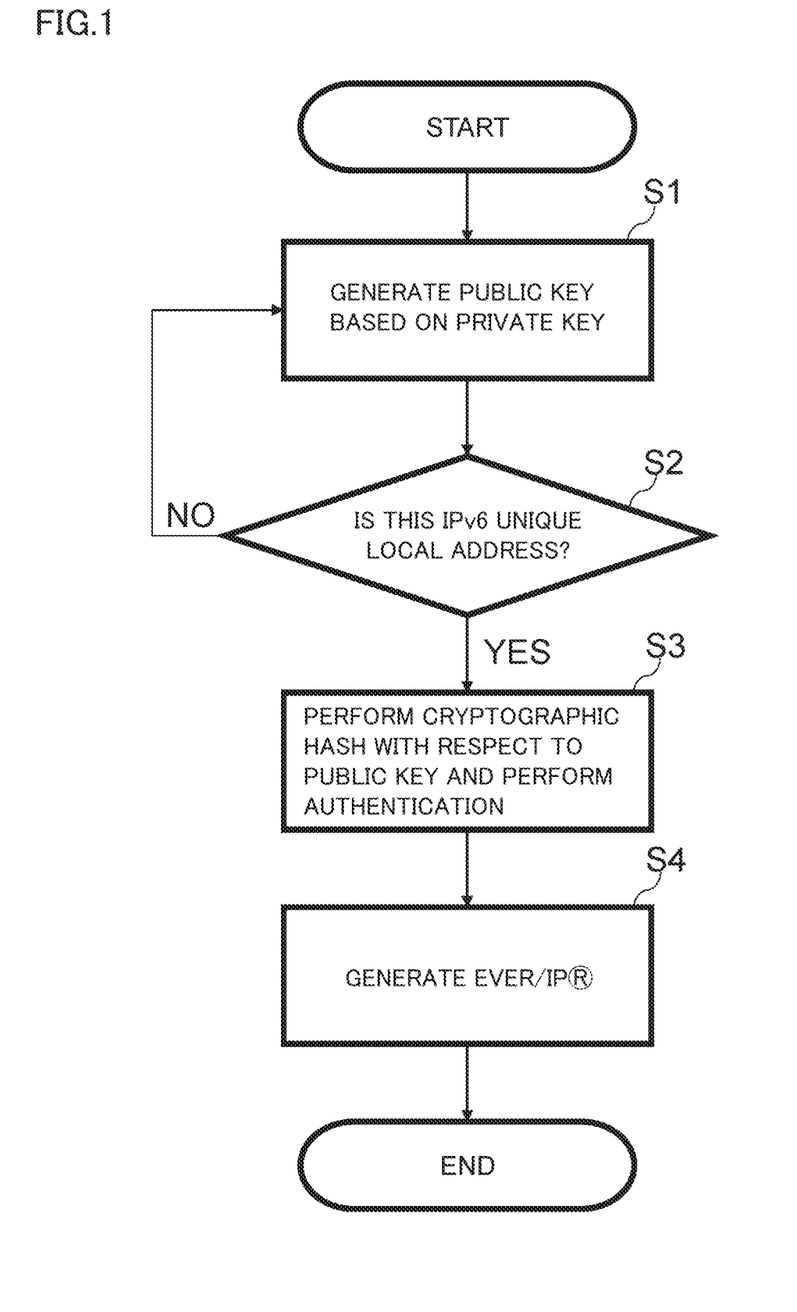
FIG. 1 is a flowchart showing an example of network address generation.

First, an example of a network address generation method will be described with reference to FIG. 1. (S1) First, a public key is generated by applying a predetermined cryptographic algorithm function to a static private key that a device has. (S2) Calculation is repeated until the head or an arbitrary part of the character string is in a 128-bit IPv6 space and becomes a character string of a unique local address. In addition, the unique local address means an address space starting with fc or fd. (S3) When a character string corresponding to the unique local address of IPv6 is generated, a predetermined value is generated by applying a cryptographic hash function to the public key, and the predetermined value is set as a network address and a formal license is granted to the public key by the certificate authority. (S4) An authenticated network address issued in association with the public key of the device is generated by the above series of processes. For example, an authentication server is used as the certificate authority, but the certificate authority is not limited to the server device.

In addition, a private key generation step by a random number generator or the like may be included before the public key generation step of (S1). The random number generator can generate a private key based on the serial number of the device or the like. In addition, the processes of steps (S1) to (S4) described above may be executed by the device itself, or may be executed by another device different from the device.

The device-specific network address obtained as described above may be referred to as EVER/IP (registered trademark). EVER/IP (registered trademark) is different from the network address assigned by the Internet service provider (ISP) as in the related art, and the device itself plays a part of the role of ISP. In addition, EVER/IP (registered trademark) and a public key have a corresponding relationship therebetween, and may be used as the same meaning. Hereinafter, EVER/IP (registered trademark) will be referred to as EverIP unless otherwise specified.

Figure 2:
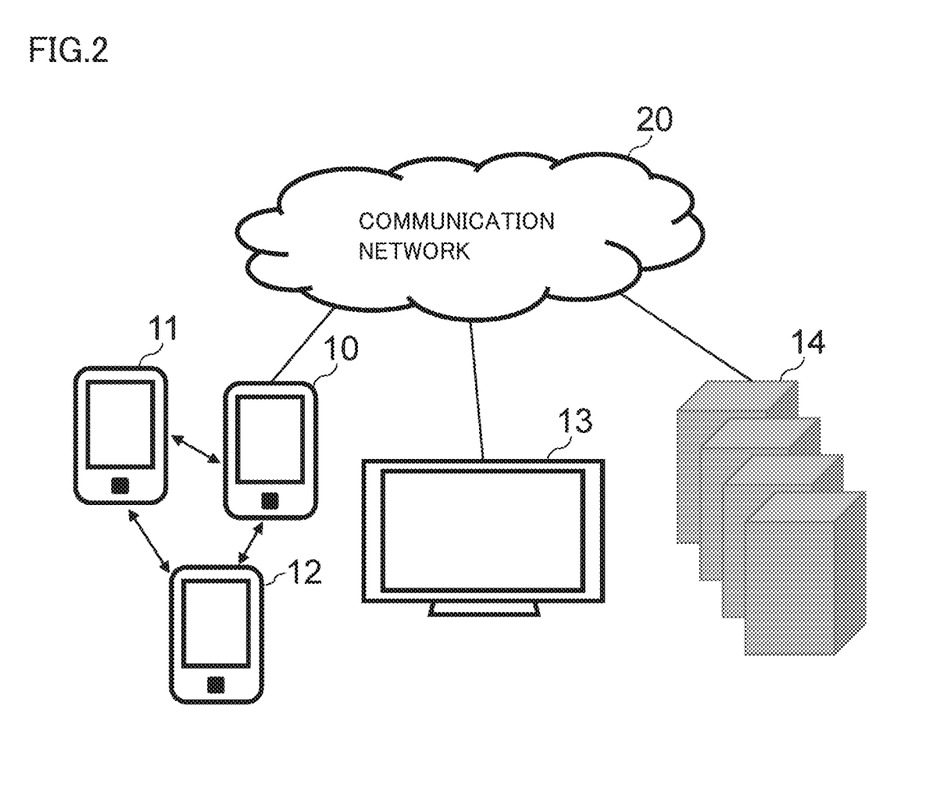
FIG. 2 is a schematic diagram showing an example of a communication connection between a terminal device and another device.

In FIG. 2, a typical communication connection in the present embodiment will be described. Terminal devices 10, 11, and 12, a video device 13, and a server 14 are devices each having a communication interface. For a communication network 20 of the present embodiment, a physical layer or a data link layer in the OSI reference model may be considered. Two devices having EverIP can be connected to each other through any communication path on the physical layer. In addition, at the first session of each device, a predetermined handshake is completed by calculating each cryptographic hash function.

The communication connection network between EverIPs on such a physical layer is hereinafter referred to as an "EVER network". In addition, if the terminal devices 10, 11, and 12 can communicate with each other by short-range wireless communication, the EVER network can also construct a mesh network. In other words, the EVER network can be said to be a second Internet overlaid on top of the existing network.

When an IP address is adopted as a typical example of a network address, the specified number of bits differs depending on the version. In IPv4 (Internet Protocol Version 4) currently established, a 32-bit address section is specified. On the other hand, in IPv6 (Internet Protocol Version 6) currently established, a 128-bit address section is specified. In the present embodiment, an IP address according to IPv6 will be mentioned as an example of a network address.

In this specification, the term "device" includes any thing capable of performing data communication through the communication network 20. Typically, the device may be configured as a single communication device, may be configured as a part of any thing, or may be configured to be embedded in any thing.

Figure 3:
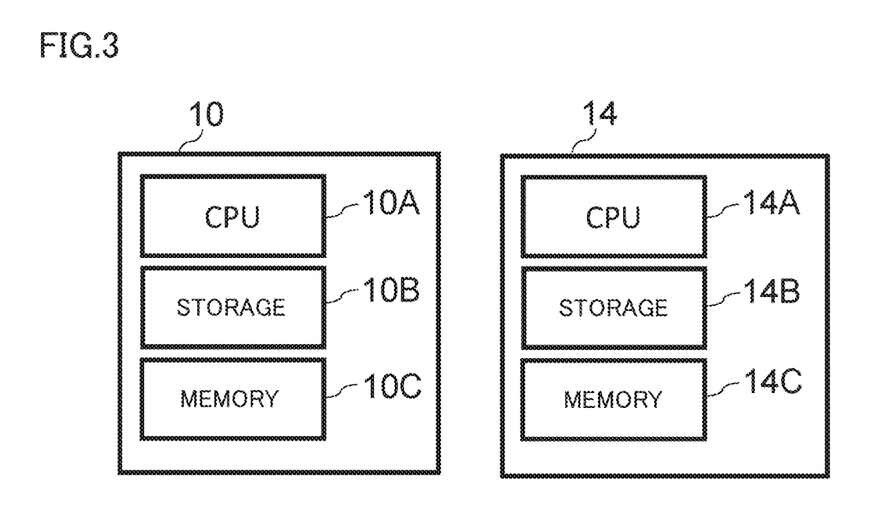
FIG. 3 is a schematic diagram showing an example of the hardware configuration of a terminal device and an example of the hardware configuration of a server.

As shown in FIG. 3, the terminal device 10 according to the present embodiment has at least a CPU 10A as a processor, a storage 10B, and a memory 10C. The server 14 has at least a CPU 14A as a processor, a storage 14B, and a memory 14C. In addition, each of the terminal device 10 and the server 14 has a communication interface, a power supply, an operation unit, and the like (not shown) as appropriate. The memory is configured to store computer-readable instructions (for example, an information processing program). For example, the memory may be configured by a read only memory (ROM) in which various programs and the like are stored, a random access memory (RAM) having a plurality of work areas in which various programs and the like executed by the processor are stored, or the like. In addition, the memory may be configured by a flash memory or the like. The processor may be a micro processing unit (MPU) or a graphics processing unit (GPU) instead of the CPU. The CPU may be configured by a plurality of CPU cores. The GPU may be configured by a plurality of GPU cores. The processor may be configured to load a program, which is designated from various programs read into the storages 10B and 14B or the ROM, to the RAM and execute various processes in cooperation with the RAM. In particular, the terminal device 10 is configured to execute an information processing method according to the present embodiment when the processor executes an information processing program stored in the memory.

The terminal device 10 may be, for example, a personal computer, a smartphone, a tablet, or a wearable device (for example, a smart watch or an AR glass) worn on the user's body (for example, an arm or a head). In addition, the terminal device 10 may be a control device installed in a smart home appliance, a connected automobile, a factory, and the like. As described above, as the type of terminal device 10, all things that are connected to a communication network, such as the Internet, using an IP address and include a processor and a memory are included.

The storages 10B and 14B are storage devices, such as a hard disk drive (HDD), a solid state drive (SSD), and a flash memory, and are configured to store programs and various kinds of data. An information processing program according to the present embodiment transmitted from the server on the Internet may be stored in the storages 10B and 14B.

The communication interface in the present embodiment may include various wired connection terminals for communicating with an external device, such as a server, through the communication network 20. In addition, the communication interface may include various processing circuits and antennas for communicating with a wireless router or a wireless base station. Wireless communication standards are, for example, Wi-Fi (registered trademark), Bluetooth (registered trademark), ZigBee (registered trademark), LPWA, or fifth generation mobile communication system (5G). In addition, the communication network also includes at least one of a local area network (LAN), a wide area network (WAN), a radio access network (RAN), and the Internet.

Figure 4:
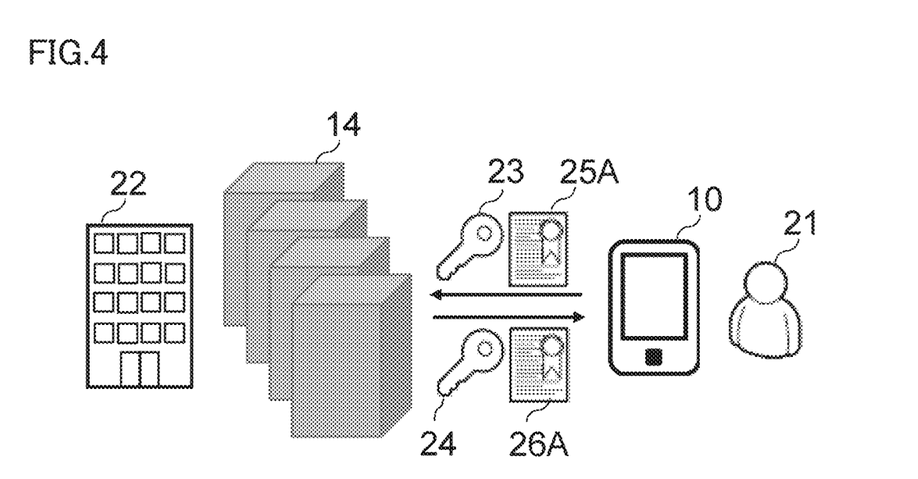
FIG. 4 is a schematic diagram showing an example of a communication connection between a terminal device and a server.

FIG. 4 shows a typical communication connection between the terminal device 10 and the server 14 of the present embodiment. As shown in FIG. 4, the terminal device 10 transmits a packet to the server 14 by, for example, the TCP/IP protocol, based on an EverIP 23 as a public key. At this time, the terminal device 10 simultaneously transmits, to the server 14, the EverIP 23 as a first network address and a digital certificate 25A authenticated by the certificate authority at the time of issuing the EverIP 23. On the other hand, the server 14 simultaneously transmits, to the terminal device 10, an EverIP 24 as a second network address and a digital certificate 26A authenticated by the certificate authority at the time of issuing the EverIP 24. The communication network 20 may be used between the terminal device 10 and the server 14.

The certificate authority proves that the digital certificate is formal. The digital certificate associated at the time of issuing the EverIP has an attribute as basic authentication. In other words, the EverIP necessarily has an attribute of basic authentication. The attribute of basic authentication is essential as a condition for establishing communication between the terminal device 10 and the server 14. Without basic authentication, no communication is established.

In addition, the terminal device 10 in the present embodiment is a mobile terminal that is owned by a user 21 and can be operated by the user 21. On the other hand, the server 14 is typically managed by a company 22, and provides various Internet services to the user 21. Internet services include online shopping, delivery services, online banking, accommodation reservation sites, online securities services, and SNS services.

In addition, the terminal device 10 and the server 14 may acquire a plurality of digital certificates associated with the EverIP 23 from the certificate authorities of a plurality of organizations. Here, an example of the digital certificate of the terminal device 10 will be described with reference to FIG. 5. As described above, the digital certificate 25A of the terminal device 10 includes basic authentication, but an additional digital certificate 25B may be further associated with the EverIP 23 of the terminal device 10. In addition, it is also possible to add an additional attribute A to the digital certificate 25A. That is, although the EverIP 23 is associated with the digital certificate 25A having at least basic authentication attributes, a plurality of digital certificates may be provided or a plurality of additional authentication attributes may be provided in each digital certificate. In addition, the second and subsequent digital certificates may necessarily include basic authentication. That is, an attribute B may be an attribute called basic authentication authenticated by another issuer.

In addition, in the present embodiment, the attributes are assigned to the digital certificate, but these may be managed by software or may be managed as an application.

Figure 5:
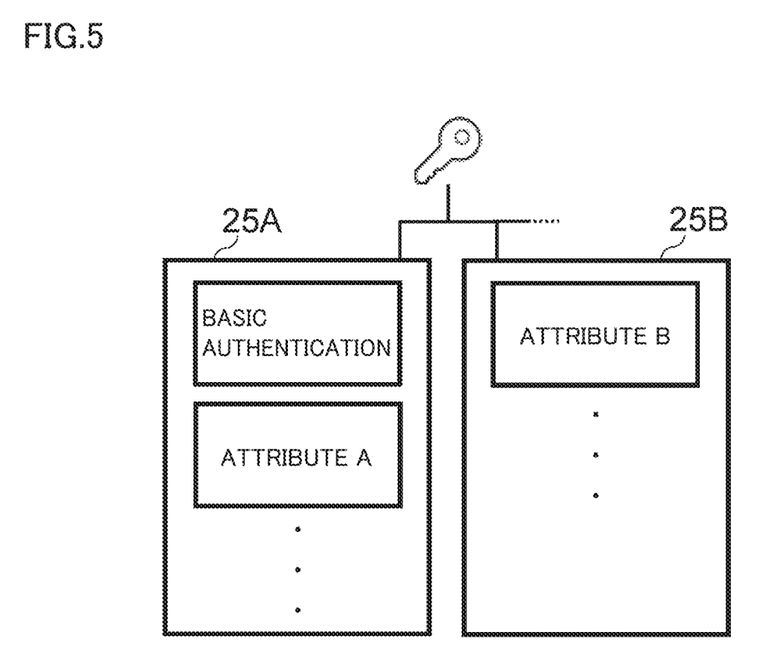
FIG. 5 is a schematic diagram showing an example of the configuration of a digital certificate and authentication information attached to the digital certificate.

When a plurality of digital certificates are provided or when a plurality of attributes are provided, it is possible to determine whether or not communication is possible according to the attributes or the presence or absence of the digital certificates. In addition, the information of the user 21 can be included as an attribute. The information of the user 21 is a name, a date of birth, a gender, an address, a telephone number, various kinds of account information, and the like. For example, information submitted by the user 21 when making a communication contract for the terminal device 10 can be included in the digital certificate as an attribute. Therefore, the user 21 can substantially omit inputting his or her own information to the terminal device 10. The user 21 may change specific user information at his or her own will.

EXAMPLE 1

Figure 6:
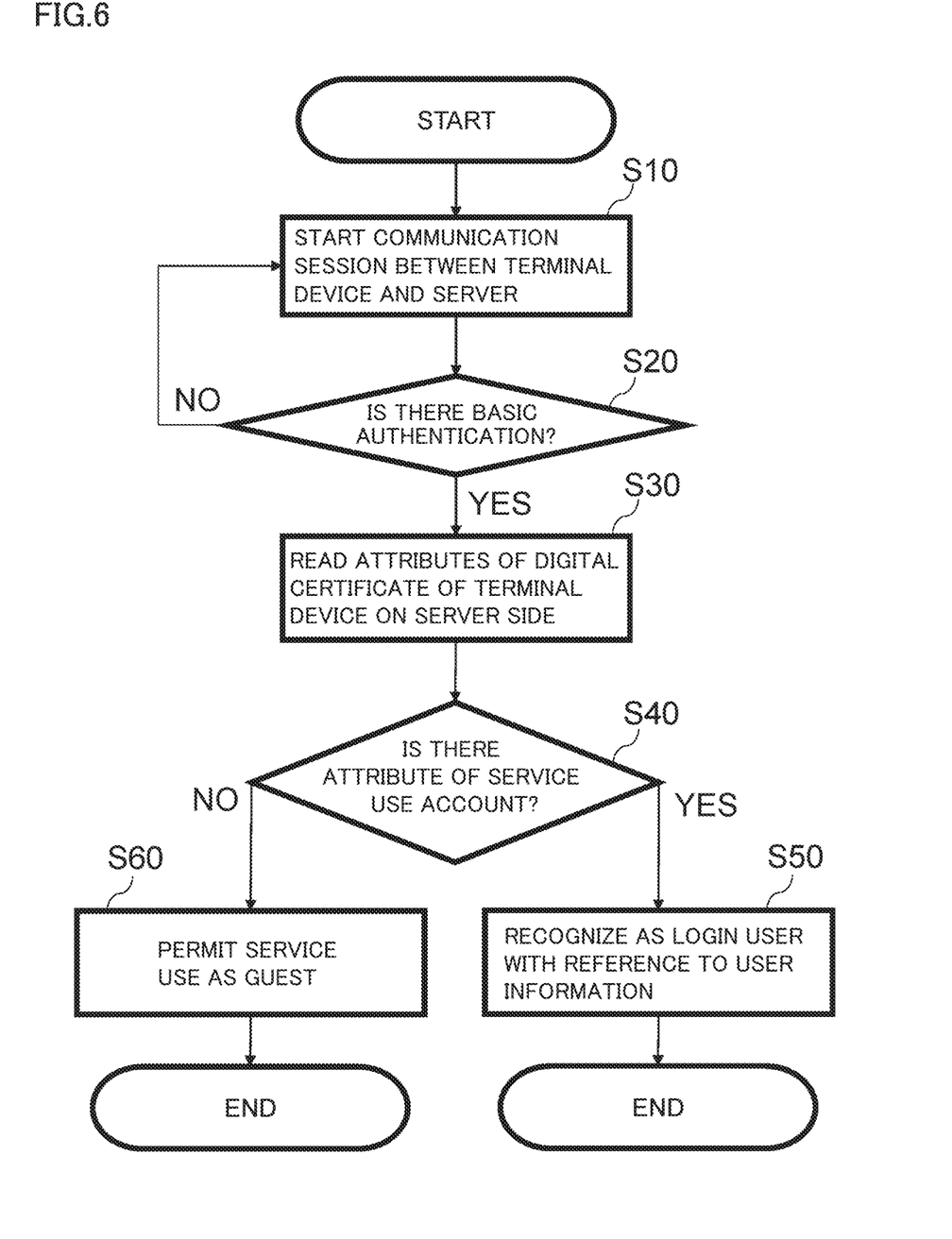
FIG. 6 is a flowchart showing an example of an authentication processing procedure between a terminal device and a server.

Example 1 in the present embodiment will be described with reference to FIG. 6. In step S10, the user 21 accesses the server 14 from the terminal device 10 in order to use the service provided by the company 22. The company 22 provides various Internet services using the server 14. First, when the server 14 does not have the EverIP 24, a service provision screen is displayed as in the case of the communication using the normal IPv4. Alternatively, communication may not be established.

In addition, in step S20, it is determined whether or not the server 14 has basic authentication. If YES in step S20, the process proceeds to step S30 in which the server 14 reads the attribute of the digital certificate 25A of the terminal device 10. Even if the server 14 has the EverIP 24, if the digital certificate 25A does not include basic authentication (NO in step S20), it is determined that the EverIP 24 has not been generated through the formal issuance procedure, and no communication is established. Alternatively, the service provision screen may be displayed as a normal IPv4 communication connection. In step S30, it is determined whether or not there is attribute information (authentication information) other than the basic authentication in the digital certificate 25A. If there is attribute information (authentication information) other than the basic authentication, what kind of attribute information is present is briefly referred to, and the process proceeds to step S40.

In step S40, the server 14 determines whether or not the attribute information of the service use account is included in the digital certificate 25A associated with the terminal device 10 and its EverIP 23.

Figure 7:
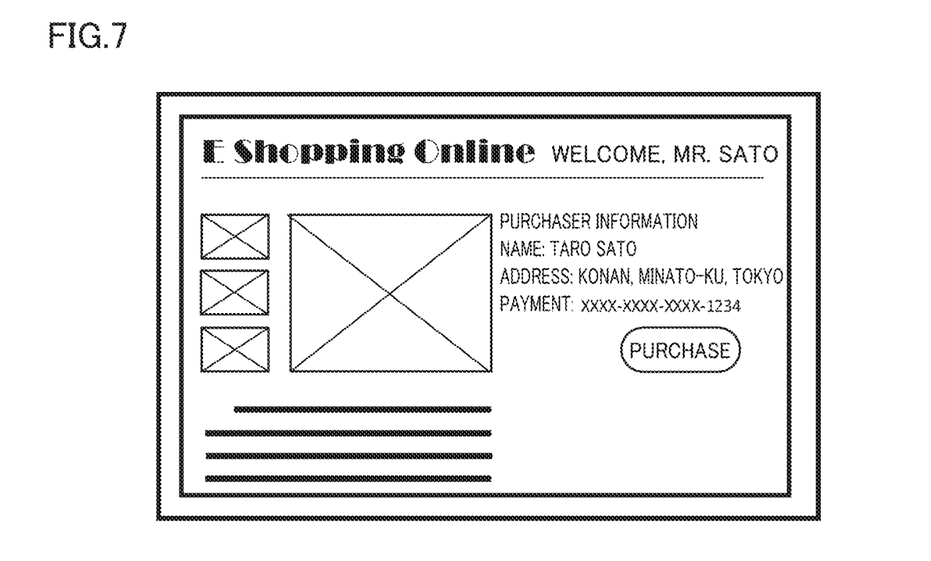
FIG. 7 is a diagram showing an example of a screen displayed on a terminal device when the Internet service is used on the terminal device.

If it is determined in step S40 that there is an attribute of the service use account, the process proceeds to step S50. That is, the server 14 permits the terminal device 10 of the user 21 to use the service as a login user. At this time, the user 21 does not need to perform the operation of "log in". As shown in FIG. 7, as a further user experience in step S50, for example, by using the user information submitted at the time of the line contract of the terminal device 10 in the Internet mail order provided by the company 22, the payment is completed only by operating the "purchase" button without the input screen. Payment can be billed in addition to the line usage fee. As a merit on the company 22 side, since the user information relevant to the terminal device 10 can be referred to only when the terminal device 10 and the server 14 are connected to each other, it is not necessary to store the information of the user 21 in the server 14. That is, there is no risk of information leakage in the company 22, and it is possible to save the trouble of the user 21 inputting various kinds of information. Therefore, since a user-friendly service environment can be provided, the effect of attracting customers can be expected.

Figure 8:
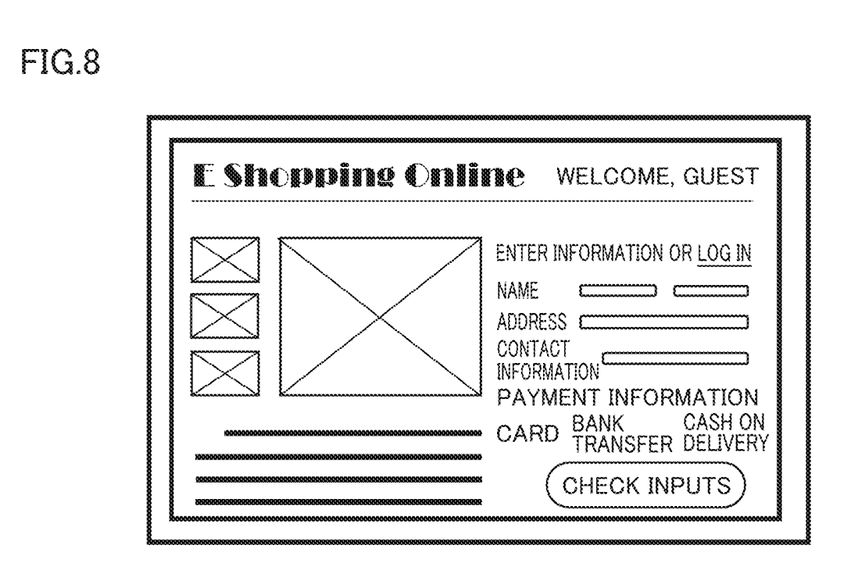
FIG. 8 is a diagram showing an example of a screen displayed on a terminal device when the Internet service is used on the terminal device.

If it is determined in step S40 that there is no attribute of the service use account, the process proceeds to step S60. That is, the server 14 permits the terminal device 10 of the user 21 to use the service as a guest. In this case, as shown in FIG. 8, the operation of "log in" is required as in the case of connection using IPv4. Alternatively, the use of the service can be completed by inputting predetermined information as a guest user. From the perspective of the company 22, user information should be stored in the server 14 in order to permit the user 21 to "log in".

EXAMPLE 2

Figure 9:
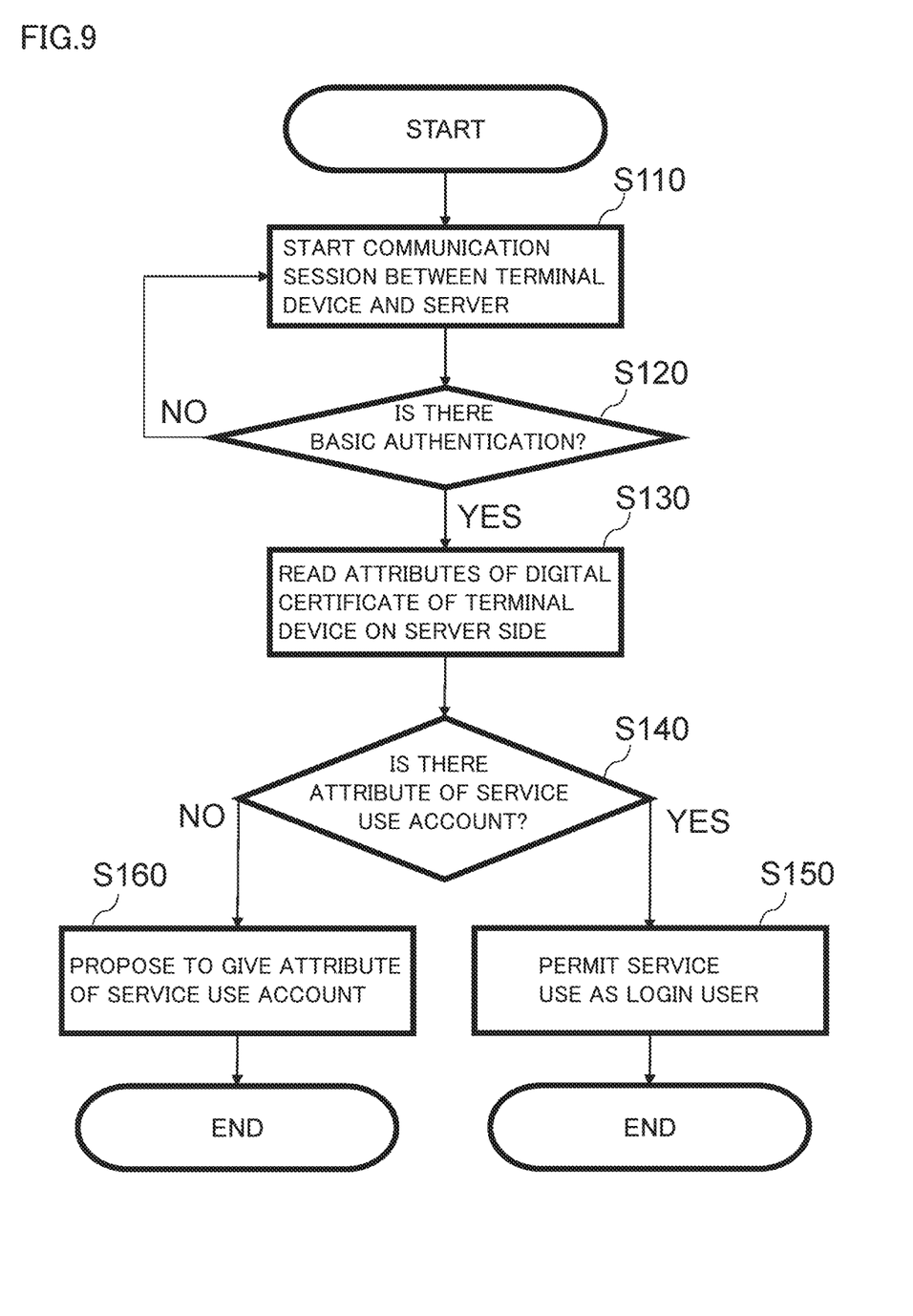
FIG. 9 is a flowchart showing an example of another authentication processing procedure between a terminal device and a server.

Example 2 in the present embodiment will be described with reference to FIG. 9. In step S110, the user 21 accesses the server 14 from the terminal device 10 in order to use the service provided by the company 22. The company 22 provides various Internet services using the server 14. First, when the server 14 does not have the EverIP 24, a service provision screen is displayed as in the case of the communication using the normal IPv4. Alternatively, communication may not be established.

In addition, in step S120, it is determined whether or not the server 14 has basic authentication. If YES in step S120, the process proceeds to step S130 in which the server 14 reads the attribute of the digital certificate 25A of the terminal device 10. Even if the server 14 has the EverIP 24, if the digital certificate 25A does not include basic authentication (NO in step S120), it is determined that the EverIP 24 has not been generated through the formal issuance procedure, and no communication is established. Alternatively, the service provision screen may be displayed as a normal IPv4 communication connection. In step S130, it is determined whether or not there is attribute information (authentication information) other than the basic authentication in the digital certificate 25A. If there is attribute information (authentication information) other than the basic authentication, what kind of attribute information is present is briefly referred to, and the process proceeds to step S140.

In step S140, the server 14 determines whether or not the attribute information of the service use account is included in the digital certificate 25A associated with the terminal device 10 and its EverIP 23.

If it is determined in step S140 that there is an attribute of the service use account, the process proceeds to step S150. That is, the company 22 can provide a service for the login user assuming that the user 21 using the terminal device 10 is a login user.

If it is determined in step S140 that there is no attribute of the service use account, the process proceeds to step S160. In step S160, the server 14 proposes to the user 21 to give the attribute of the service use account to the digital certificate 25A. That is, a screen for selecting whether or not the digital certificate 25A of the terminal device 10 has an attribute as the service use account may be displayed. In this case, from the next connection, it can be determined that the digital certificate 25A is a service use account at the time of determination in steps S130 and S140, so that the process proceeds to step S150. If it is determined in step S160 that the user 21 does not assign the attribute as a service use account to the digital certificate 25A of the terminal device 10, the same proposal may be made to the user 21 next time.

EXAMPLE 3

Figure 10:
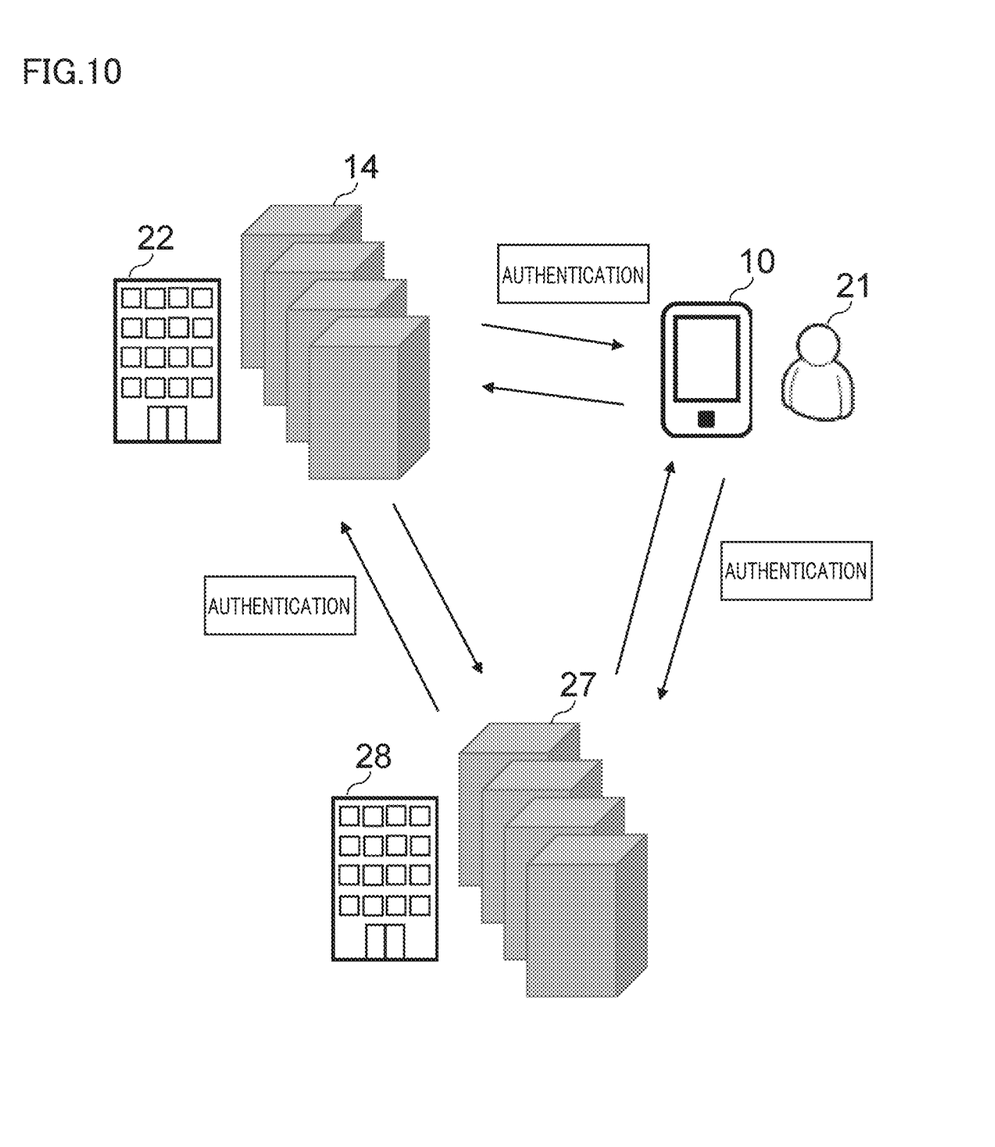
FIG. 10 is a schematic diagram showing authentication among a terminal device, a server, and a database.

Next, an authentication process between a plurality of devices will be described with reference to FIG. 10. A data issuer 28 is, for example, a credit card company that issues credit cards or an administrative agency that issues identification cards. The data issuer 28 has a database 27. Each of the terminal device 10, the server 14, and the database 27 has its own EverIP. Therefore, the terminal device 10, the server 14, and the database 27 can recognize where each communication came from. The database 27 is preferably stored in a server or the like.

Here, when the user 21 makes a credit card payment at the company 22, it has conventionally been necessary to input the credit card information in a predetermined form. The company 22 needed to check the authenticity of data as to whether or not the credit card information was issued by the data issuer 28. Alternatively, when the data issuer 28 was an administrative agency, the user had to go to the government office to obtain administrative documents. The government office compares the personal information of the user with the information stored in the database 27 of the administrative agency, and issues various certificates (resident's card and the like) when the authenticity is confirmed.

In this example, the EverIP of the database 27 of the data issuer 28 authenticates the credit card information as user information in the EverIP 23 that the terminal device 10 of the user 21 has. In addition, the EverIP of the database 27 of the data issuer 28 has attribute information for authenticating the EverIP 23 of the terminal device 10. By inquiring about the EverIP of the database 27 of the data issuer 28, the server of the company 22 (or the server of the government office) can know that the EverIP of the database 27 of the data issuer 28 authenticates the EverIP 23 of the terminal device 10.

Therefore, when the user 21 tries to make a credit card payment on the terminal device 10, the authentication information can be checked among the EverIP of the database 27 of the data issuer 28, the EverIP 23, and the EverIP 24, so that it is necessary to input the credit card information. Even when the user 21 issues various certificates at the government office, it is possible to authenticate each other among the EverIP of the database 27 of the administrative agency, the EverIP 23, and the EverIP 24, so that the authenticity of the data can be checked without performing collation work at the government office.

In the example described above, since there is a unique network address authenticated in advance and set for the device, it is possible to recognize from which device the communication comes from. Then, the authenticity of the network address can be checked based on the attribute information or the authentication information. In addition, the device can make a proposal or perform further authentication processing based on the presence or absence of attribute information or authentication information. Therefore, not only can the secure communication among the user 21, the company 22, and the data issuer 28 be ensured, but also the authenticity of the authentication information can be guaranteed at the same time. In addition, the above-described authentication process is not limited to the illustrated examples, and can be used in all authentication situations.

It should be considered that the embodiment disclosed is an example in all points and not restrictive. The scope of the present invention is defined by the claims rather than the above description, and is intended to include all modifications within the scope and meaning equivalent to the claims.

REFERENCE SIGNS LIST

10 TERMINAL DEVICE
14 SERVER
23, 24 EverIP
25A, 26A DIGITAL CERTIFICATE
25B ADDITIONAL DIGITAL CERTIFICATE
27 DATABASE
28 DATA ISSUER

The invention claimed is:

1. An information communication method, comprising:
a step of providing a first network address of a first network-enabled entity associated with a user, the first network-enabled entity cryptographically determining the entire first network address;
a step of associating the first network address to the first network-enabled entity with user information of the user, the first network address being distinct from the user information;
a step of making a communication connection between the first network-enabled entity and a second entity; and
a step in which the second entity refers to the user information associated with the first network address.

2. The information communication method according to claim 1, further comprising:
a step of providing a second network address of the second entity, the second network-enabled entity cryptographically determining the entire second network address;
a step of granting a formal license to a public key related to the first network address by a certificate authority; and
a step of granting a formal license to a public key related to the second network address by the certificate authority.

3. The information communication method according to claim 1, wherein after referring to the user information, the second entity provides a service based on the user information without acquiring the user information of the user who owns the first network-enabled entity.

4. The information communication method according to claim 1, wherein the associating of the user information is performed by approval of the user.

5. The information communication method according to claim 1, wherein the associating of the user information is performed at a request of the second entity.

6. The information communication method according to claim 1, wherein the first network-enabled entity is a portable terminal, and the portable terminal associates the user information at the time of line contract with the first network address.

7. The information communication method according to claim 1, further comprising:
a step in which the second entity determines whether or not the user has a service use account based on the user information.

8. The information communication method according to claim 7, further comprising:
a step of generating the second network address in the second entity; and
a step of setting the first network address and the second network address in the first network-enabled entity and the second entity, respectively, after authenticating the first network address and the second network address by the certificate authority.

9. The information communication method according to claim 7, wherein upon determining that the user does not have the service use account, the second entity requests the first network-enabled entity to generate the service use account.

10. The information communication method according to claim 9, wherein upon approval to generate the service use account on the first network-enabled entity, the second entity stores service use account information.

11. The information communication method according to claim 7, wherein upon determining that the user has the service use account, the second entity permits the first network-enabled entity to use a service.

12. The information communication method according to claim 7, wherein the first network-enabled entity is a portable terminal, and the portable terminal associates user information at the time of line contract with the first network address.

13. A non-transitory storage medium having thereon a program causing a computer to execute the information communication method according to claim 1.

14. The information communication method according to claim 1, wherein the user information comprises one or more of a name, a date of birth, a gender, an address, a telephone number, account information of the user, or credit card information.

15. The information communication method according to claim 1, wherein the first network-enabled entity and/or the second entity comprise one or more of a terminal device and a server.

16. The information communication method according to claim 1, further comprising randomly generating a private key for cryptographically determining the entire first network address in the first network-enabled entity.

17. An information communication method in which a first network address, a second network address, and a third network address are provided, the method comprising:
setting the first network address in a first network-enabled entity, the first network-enabled entity cryptographically determining the entire first network address;

authenticating the first network address by the third network address;

associating the second network address with the third network address for authentication;

authenticating the first network address as the third network address by the second network address; and referring to user information associated with the first network address, the user information including personal information of a user, and the first network address being distinct from the user information.

18. The information communication method according to claim 17, wherein the first, second, and third network addresses are set in an entity after being authenticated by the certificate authority.

19. The information communication method according to claim 18, wherein the second network address is set in a second entity, and the third network address is set in a third entity.

20. The information communication method according to claim 19, wherein the first network-enabled entity and/or the second entity and/or the third entity comprise one or more of a terminal device, a first server, and a second server.

21. An information communication system, comprising:
a first network-enabled entity;
a second entity;
a first network address that is uniquely set in advance in the first network-enabled entity, the entire first network address being cryptographically determined by the first network-enabled entity; and the first network address is associated with user information including personal information in the first network-enabled entity, and the second entity refers to the user information associated with the first network address when communicating with the first network-enabled entity;

wherein the first network address associated with user information is distinct from the user information.

22. The information communication system according to claim 21, wherein the second entity is configured to:
receive, from the first network-enabled entity associated with a user, a network address unique to the first network-enabled entity and a digital certificate that is associated with the network address and includes attribute information of the user; and
permit the user to log in to the predetermined site based on the attribute information of the user included in the digital certificate.

23. The information communication system according to claim 22, wherein the permitting the login comprises:
determining whether or not the attribute information of the user includes user login information necessary for logging in to the predetermined site; and
permitting the user to log in to the predetermined site when the attribute information of the user includes the user login information.

* * * * *